(12) United States Patent
Craig

(10) Patent No.: US 10,088,094 B2
(45) Date of Patent: Oct. 2, 2018

(54) SYSTEM FOR ANCHORING A PORTABLE DEVICE TO A FLOOR

(71) Applicant: SRM, LLC, Springfield, MO (US)

(72) Inventor: James Craig, New Hartford, MO (US)

(73) Assignee: SRM, LLC, Springfield, MO (US)

( * ) Notice: Subject to any disclaimer, the term of this patent is extended or adjusted under 35 U.S.C. 154(b) by 0 days.

(21) Appl. No.: 14/859,288

(22) Filed: Sep. 19, 2015

(65) Prior Publication Data
US 2016/0084427 A1   Mar. 24, 2016

Related U.S. Application Data

(60) Provisional application No. 62/052,888, filed on Sep. 19, 2014.

(51) Int. Cl.
F16M 7/00 (2006.01)
F16M 13/02 (2006.01)
(Continued)

(52) U.S. Cl.
CPC ............... *F16M 7/00* (2013.01); *B60T 3/00* (2013.01); *B61H 7/00* (2013.01); *B62B 5/00* (2013.01); *F16B 21/09* (2013.01); *F16M 3/00* (2013.01); *F16M 13/02* (2013.01); *B60P 7/0807* (2013.01); *B60P 7/0815* (2013.01); *B60T 1/005* (2013.01);
(Continued)

(58) Field of Classification Search
CPC . A47B 91/08; A47B 2097/008; Y10T 24/309; Y10T 24/44026; Y10T 24/45105; F16B 5/0657; F16B 21/09; F16B 37/045; B60P 7/0807; B60P 7/0815; B64D 11/0696; B64D 9/003; F16M 7/00; F16M 3/00

USPC ........ 248/500, 501, 502, 507; 410/2, 3, 4, 7, 410/77, 80, 81, 101, 8, 104; 24/666, 667
See application file for complete search history.

(56) References Cited

U.S. PATENT DOCUMENTS 793,942 A * 7/1905 Leach ................... F04D 29/646
248/224.7
2,575,968 A * 11/1951 McCallum ............... F16M 3/00
280/79.11
(Continued)

FOREIGN PATENT DOCUMENTS

GB 2441184 A 2/2008
JP 2002153342 A 5/2002
(Continued)

*Primary Examiner* — Jonathan Liu
*Assistant Examiner* — Taylor L Morris
(74) *Attorney, Agent, or Firm* — Husch Blackwell LLP

(57) ABSTRACT

An anchoring system for a movable structure is provided. The anchoring system can include a base plate and an anchor rod assembly. The base plate includes a slot configured for receiving a portion of the anchor rod assembly. The slot can include a pocket for receiving and retaining the portion of the assembly. The assembly can be secured to the movable structure and can include a handle component, an extension component and an anchor rod having a threaded member engaged with the extension component and handle component so that the anchor rod can be lifted and lowered relative to the extension component. The system can be operated by moving the structure so that the anchor assembly engages the slot of the base plate and enters the pocket. The anchor rod is then retracted within the pocket, thereby securing the structure.

19 Claims, 9 Drawing Sheets

(51) Int. Cl.
  *F16B 21/09* (2006.01)
  *B60T 3/00* (2006.01)
  *B61H 7/00* (2006.01)
  *B62B 5/00* (2006.01)
  *F16M 3/00* (2006.01)
  *B60P 7/08* (2006.01)
  *B61D 45/00* (2006.01)
  *F16B 37/04* (2006.01)
  *F16D 63/00* (2006.01)
  *B60T 1/00* (2006.01)

(52) U.S. Cl.
  CPC .......... *B61D 45/001* (2013.01); *F16B 37/045* (2013.01); *F16D 63/006* (2013.01)

(56) References Cited

U.S. PATENT DOCUMENTS

| | | | | |
|---|---|---|---|---|
| 2,583,695 | A * | 1/1952 | Gleekman | A61H 31/02 248/656 |
| 3,382,416 | A * | 5/1968 | Jacobs | F16B 5/0233 361/645 |
| 3,529,860 | A * | 9/1970 | Jelley | F16B 21/09 160/402 |
| 3,878,573 | A | 4/1975 | Boudewyn | |
| 4,213,593 | A * | 7/1980 | Weik | B64D 11/0696 248/501 |
| 4,460,147 | A * | 7/1984 | Macbain | F16B 12/22 248/222.41 |
| 4,630,982 | A * | 12/1986 | Fenner | B61D 45/001 24/265 CD |
| 4,688,843 | A * | 8/1987 | Hall | A61G 3/0808 248/503.1 |
| 4,752,055 | A * | 6/1988 | Ishida | F16B 37/045 248/298.1 |
| 4,787,577 | A * | 11/1988 | Whittle | B64C 1/1415 244/118.2 |
| 5,507,610 | A * | 4/1996 | Benedetti | F16B 5/0628 24/297 |
| 5,975,822 | A * | 11/1999 | Ruff | B64D 11/0696 292/218 |
| 6,024,330 | A | 2/2000 | Mroz et al. | |
| 6,032,349 | A * | 3/2000 | Wagner | F16B 21/09 29/464 |
| 6,142,892 | A * | 11/2000 | Dennis | A63B 63/004 248/74.3 |
| 6,146,071 | A * | 11/2000 | Norkus | F16B 37/044 296/187.09 |
| 6,237,970 | B1 * | 5/2001 | Joannou | E05B 65/006 292/241 |
| 6,409,129 | B1 * | 6/2002 | Chen | A47B 91/024 248/188.8 |
| 6,644,901 | B2 * | 11/2003 | Breckel | B61D 45/001 410/104 |
| 7,775,498 | B2 * | 8/2010 | Phillips | A47L 15/4253 248/500 |
| 8,291,553 | B2 * | 10/2012 | Moberg | B60J 5/0468 24/297 |
| 8,353,649 | B2 * | 1/2013 | Csik | F16B 37/045 411/108 |
| 2013/0330125 | A1 * | 12/2013 | Aoki | H01R 13/621 403/356 |
| 2015/0021448 | A1 * | 1/2015 | Cothern | A47J 36/34 248/123.2 |

FOREIGN PATENT DOCUMENTS

| | | | |
|---|---|---|---|
| JP | 2005278712 A | 10/2005 | |
| JP | 2006055377 A | 3/2006 | |
| JP | WO2012118145 | * 9/2012 | .......... H01R 13/621 |
| JP | 5107311 B2 | 12/2012 | |
| JP | 2013144042 A | 7/2013 | |

* cited by examiner

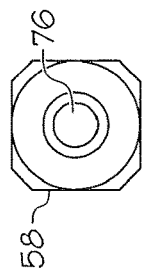
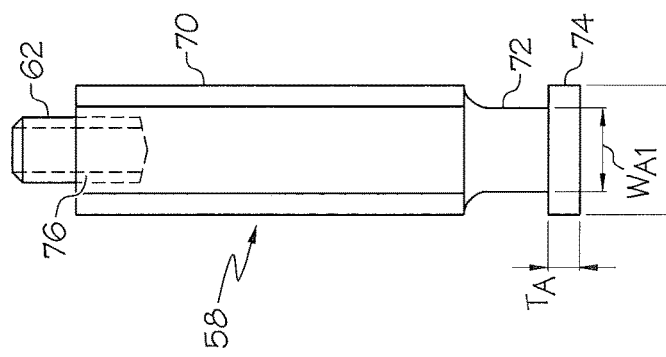
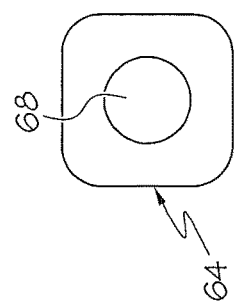

SYSTEM FOR ANCHORING A PORTABLE DEVICE TO A FLOOR

CROSS-REFERENCE TO RELATED APPLICATIONS

This Application claims priority to U.S. Provisional Patent Application Ser. No. 62/052,888, filed on Sep. 19, 2014, to James Craig, entitled "System for Anchoring a Portable Device to a Floor," the entire disclosure of which is incorporated herein by reference.

BACKGROUND OF THE INVENTION

The present invention relates to anchoring or docking systems for portable or movable devices, including but not limited to vessels, tanks, storage containers, crates, equipment, machinery, appliances, structures and the like. Such anchoring systems are used to temporarily secure the portable device in a fix position and commonly incorporate a retainer portion secured to the floor and an attachment portion secured to the device. These systems typically operate by securing the attachment portion and the retainer portion using a pin-lock system or frictional forces. However, such systems do not necessarily restrain movement in all directions and are susceptible to failure during earthquakes, tremors, aftershocks and other seismic events or in conditions where the portable devices are subject to other lateral and vertical forces, such as during shipment or transportation.

Accordingly, a need exists for an anchoring system for a portable device that can safely secure the portable device against movement in multiple directions and during earthquakes, tremors and other seismic events.

SUMMARY OF THE INVENTION

The present invention is directed generally to an anchoring system for removably securing a portable device or vessel to a floor or surface. The anchoring system can restrain the portable vessel against movement in both the vertical and horizontal directions and against movement during seismic events such as earthquakes and tremors. The anchoring system can include a base plate and a retractable anchor rod assembly according to one embodiment of the present invention. Multiple base plate/anchor rod assembly combinations can be used to secure the portable vessel depending on the particular application. The retractable anchor rod assembly can be attached to the vessel directly or can be attached to a frame coupled to the vessel. According to one embodiment of the present invention, the retractable anchor rod assembly can include an anchor rod having a base connected to one end and a threaded member connected to the other end, a tubular anchor extension component and a handle component. A portion of the anchor rod can be insertible into the extension component and the threaded member can extend through an opening in the top of the extension component. The handle component can be threaded onto the threaded member above the extension component. The threaded member allows the anchor rod to be lifted and lowered within the extension component by turning the handle component, thereby, creating a retractable assembly.

The base plate can be secured to the floor or other surface through the use of anchor bolts according to one embodiment of the present invention. The base plate can also be welded or otherwise secured to the floor surface. The base plate can have a square, rectangular, or other suitable shape depending on the particular embodiment. Defined in the base plate can be a slot or cutout that extends through the entire thickness of the plate or through a substantial portion of the plate thickness. The slot can include an angled portion and a straight portion and can be shaped and configured for receiving and engaging a portion of the anchor rod from the retractable anchor rod assembly. Within the base plate slot can be a channel and a pocket defined by the slot sidewalls. The channel can be a generally longitudinal sub-slot configured for receiving the base portion of the anchor rod when the anchor rod is received by the base plate slot. The channel can also restrict the vertical movement of the base portion of the anchor rod when it is engaged with the channel. The pocket can be a generally vertically-orientated region positioned within the slot and configured for receiving and restraining the base portion when the anchor rod is received by the slot and the retractable anchor assembly is lifted into a locked position. The pocket can restrict movement of the base portion in all horizontal directions as well as a vertical direction when the assembly is lifted into the locked position.

According to one embodiment of the present invention, to operate the anchoring system, the base plates first must be secured to the floor and the retractable anchor rod assemblies must be connected to the vessel or vessel frame. The anchor rod assemblies can be in a retracted position when not in use to avoid contacting the floor. To secure the vessel in the location of the base plates, the vessel is moved so that the retractable rod assemblies align with, and are adjacent to, the base plates. The anchor rod assemblies can then be placed into an extended position where the base section of the anchor rod contacts the floor or rests just above the floor. The vessel is then moved toward the base plates so that the anchor rods are received by the base plate slots. When the anchor rods enter the slots, the base sections travel through the channels of the slots until they reach the pocket. Once the base sections have entered the pockets in the base plate slots, the handles on the retractable rod assemblies can be turned in order to raise the base sections of the anchor rods within the pockets until the base section is secured by the interior walls defining the pocket. The vessel is then secured into place. To undock the vessel, the handles are turned until the anchor rod assembly is in the extended position and the vessel is then pulled away from the base plates until the anchor rods exit the slots defined in the base plates.

Other aspects and advantages of the present invention will be apparent from the following detailed description of the preferred embodiments and the accompanying drawing figures.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views:

FIG. 9 is a top plan view of a top plate of an retractable anchoring rod assembly used in an anchoring system in accordance with one embodiment of the present invention;

FIG. 10A is a top plan view of an anchor rod and a threaded rod member of a retractable anchoring rod assembly used in an anchoring system in accordance with one embodiment of the present invention;

FIG. 10B is a side view of the anchor rod of FIG. 10A;

DETAILED DESCRIPTION OF THE INVENTION

Figure 1:
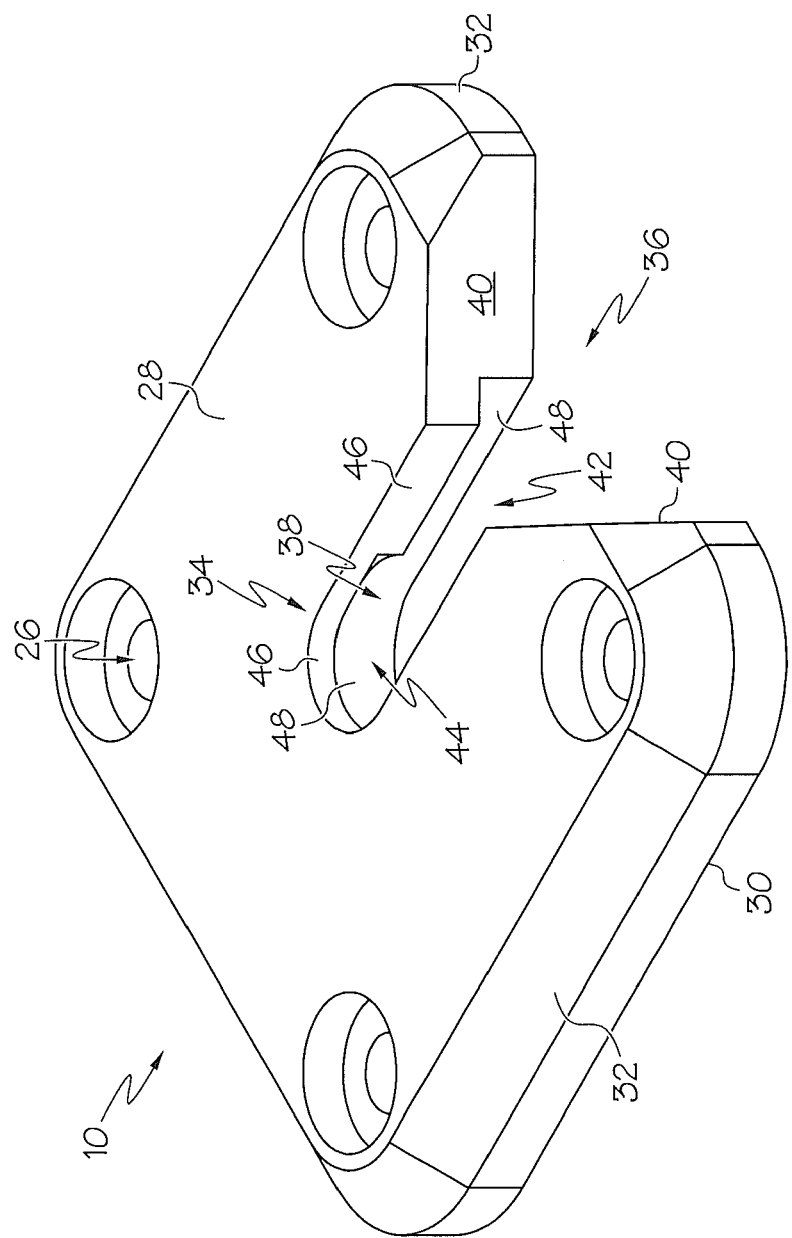
FIG. 1 is a perspective view of a base plate used in an anchoring system in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures. It will be appreciated that any dimensions included in the drawing figures are simply provided as examples and dimensions other than those provided therein are also within the scope of the invention.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The present invention is directed generally to a system 10 and method for anchoring or securing a portable device 14 to a floor or other surface 12. One embodiment of the system 10 is adapted for securing or locking portable vessel 14 to floor 12 so that vessel 14 is restrained from moving laterally and vertically during earthquakes, tremors, aftershocks and other seismic events. As described in greater detail below, system 10 can be designed to selectively lock or anchor portable vessel 14 to floor 12, yet maintain its ease of portability when desired.

While system 10 is primarily described herein in connection with a portable vessel 14, it will be appreciated that system 10 may be implemented in connection with other portable devices or structures 14, including but not limited to hospital beds, ambulance cots, medical equipment, industrial or manufacturing equipment, machinery, office equipment, appliances, furniture, storage bins, tables, work benches, racks, carts, scaffolding or any other portable devices having wheels, casters, rollers or the like. System 10 may also be used in connection with securing items during transit, for example items being transported in watercraft, aircraft, trains, trucks and the like. It will be appreciated that, depending upon size, weight, expected seismic activity and other factors, more than one system 10 may be implemented with a particular device 14. For example, depending upon such factors, two, three, four or more systems 10 may be installed on a device.

Figure 2:
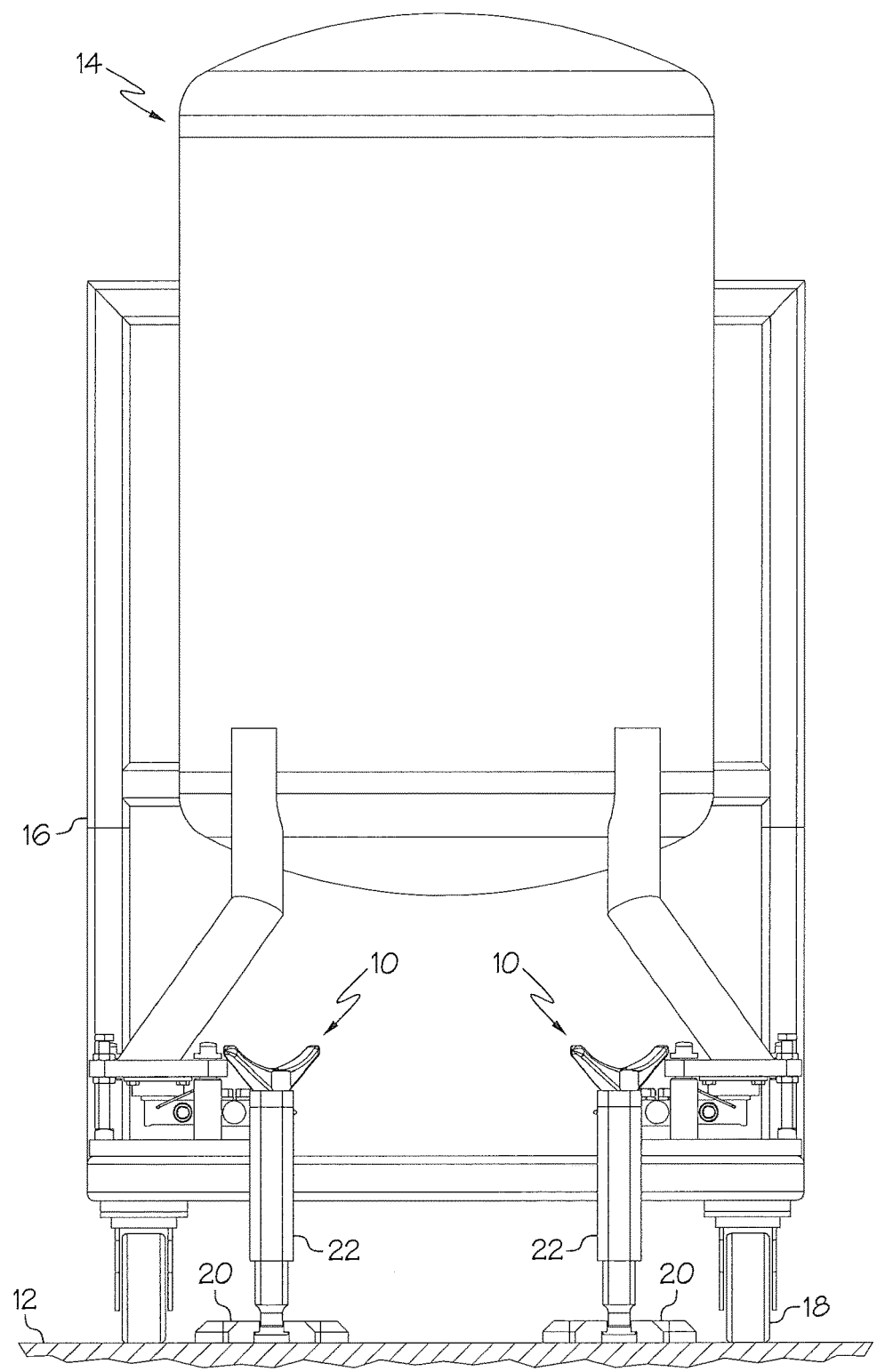
FIG. 2 is a side view of an anchoring system in use with a portable vessel in accordance with one embodiment of the present invention.
Figure 3:
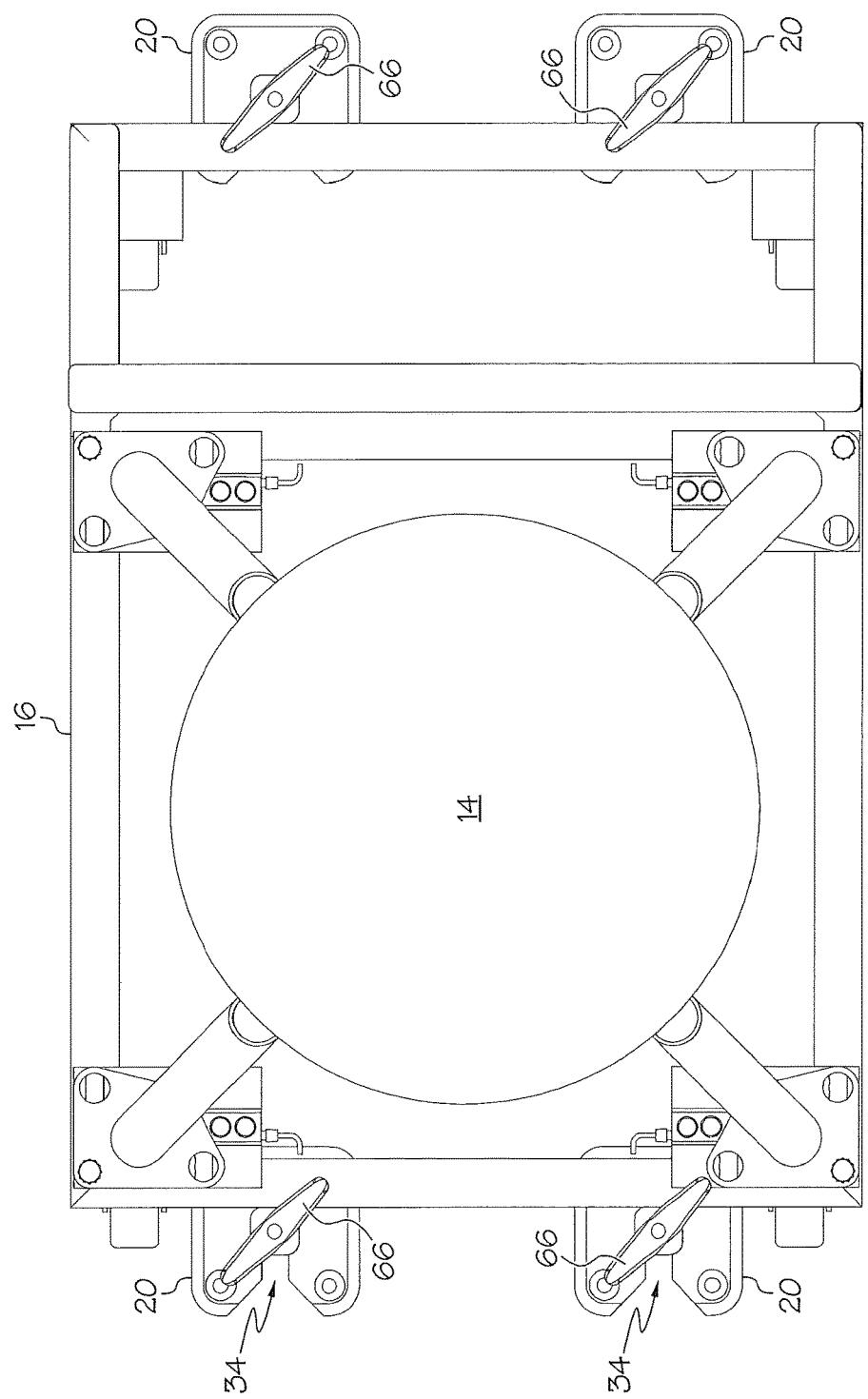
FIG. 3 is a top plan view of the anchoring system and portable vessel of FIG. 2.

Turning now to the figures, FIGS. 2 and 3 illustrate anchoring system 10 implemented with a portable device or vessel 14. The figures illustrate device 14 being mounted to a frame 16 having caster wheels 18 attached thereto. Attached to frame 16 can be a retractable anchor rod assembly 22, which when used in conjunction with a base plate 20, can generally comprise anchoring system 10. As described in greater detail below, device 14 can be secured into place using system 10 by moving device 14 and securing retractable anchor rod assembly 22 and base plate 20 together and into a locked position.

As best shown in FIG. 1, base plate 20 can include a top wall 28, a bottom wall 30, and a plurality of side walls 32 extending between top and bottom walls 28 and 30. Base plate 20 can further include a depth or thickness $T_{BP}$ defined by the distance between top wall 28 and bottom wall 30. The figures show base plate 20 having four side walls 32; however, several alternative configurations with more or less side walls 20 can be used in alternative embodiments of the present invention. Side walls 20 can also include chamfered or sloped edges, as illustrated in FIG. 1, which may minimize tripping over base plate 20 when a device 20 is not locked into location above base plate 20. In an alternative embodiment, base plate 20 can be imbedded into floor 12 so that top wall 28 is approximately even with floor 12. In such an embodiment, base plate 20 need not have any exteriorly defined side walls 32.

Figure 13:
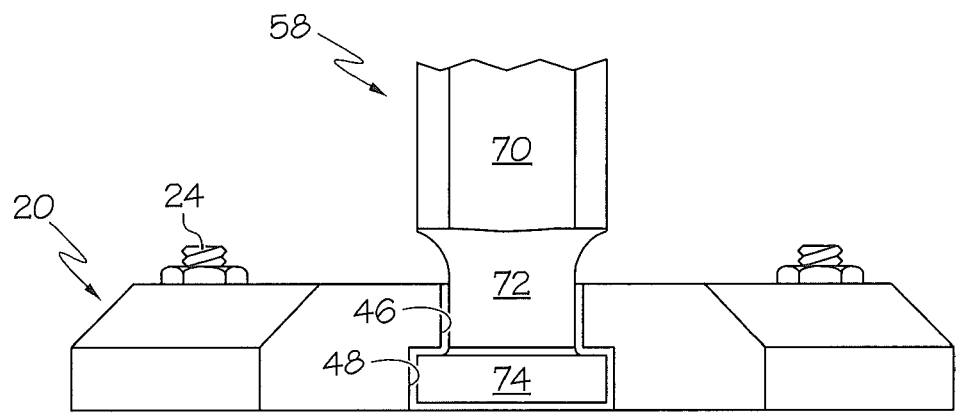
FIG. 13 is a side view of the anchoring system of FIG. 11, illustrating an anchor rod engaged with the slot of a corresponding base plate.

Base plate 20 can be secured to a floor 12 or other surface so that the bottom wall 30 rests on top of the finished floor 12 (or imbedded in floor 12 as described above). As shown in FIGS. 1 and 13, base plate 20 can include one or more apertures 26 configured for receiving fasteners or anchor bolts 24. Fasteners 24 can be used to secure base plate 20 to the floor 12. Alternatively, base plate 20 can be welded if a steel floor is available, or can be attached to floor 12 or other surface in any other suitable fashion. Typically, base plate 20 will be fastened to floor 12 where portable device 14 is intended to be locked into place for operation or storage.

Base plate 20 can also include a cutout or slot 34 defined through the entire thickness $T_{BP}$ of base plate 20. Alternatively, base slot 34 can extend downward from top wall 28 through a substantial portion of base plate thickness. $T_{BP}$ but not all the way through bottom wall 30. Slot 34 can extend generally longitudinally into base plate 20 from one its sidewalls 32, as best shown in FIG. 1. As shown, slot 34 can begin at sidewall 32 with an angled portion 36, which facilitates proper alignment of the retractable anchor rod assembly 22 with base plate 20, as described in greater detail below. Angled portion 36 can be defined by angled portion sidewalls 40. As slot 34 extends further into base plate 20, it can transition from angled portion 36 to a straight portion 38. As shown in FIG. 1, straight portion 38 can continue extending into base plate 20 until it reaches the general center of base plate 20. Configured within slot 34 and straight portion 38 can be a channel 42 and a pocket 44. Channel 42 can be configured for receiving a portion of rod assembly 22 and pocket 44 can be configured for receiving and retaining a portion of rod assembly 22, as described in greater detail below.

Figure 4:
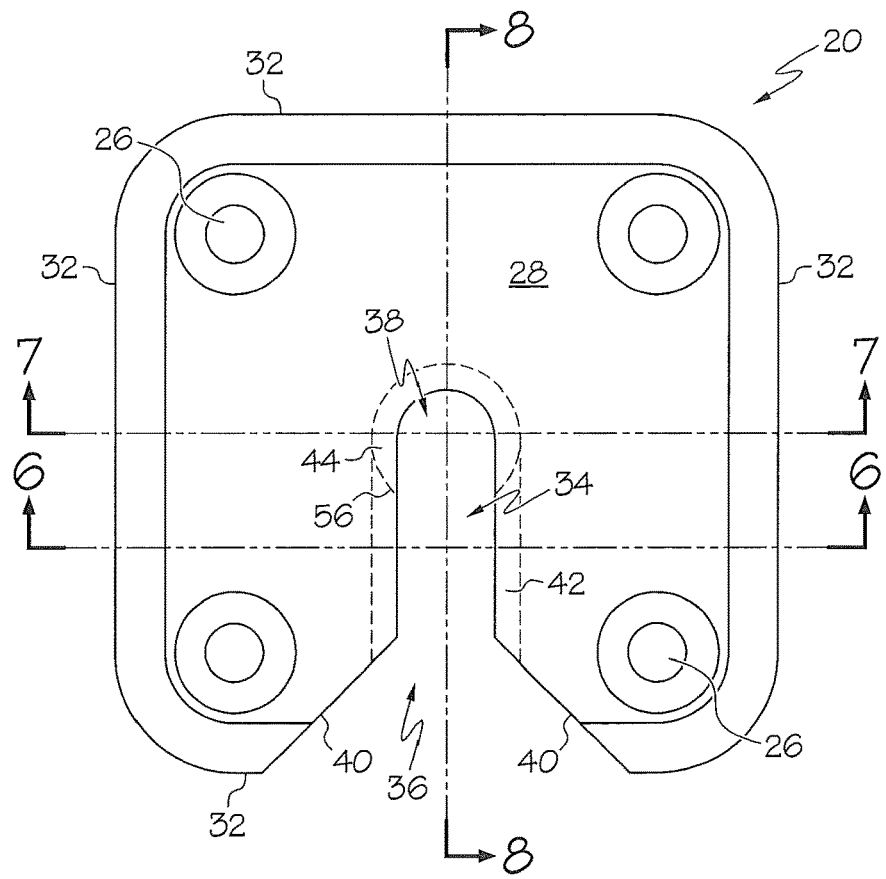
FIG. 4 is a top plan view of a base plate used in an anchoring system in accordance with one embodiment of the present invention.
Figure 5:
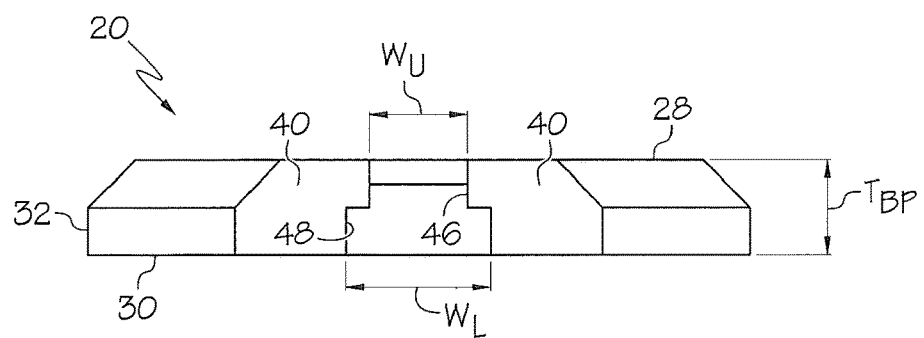
FIG. 5 is a side view of the base plate of FIG. 4.
Figure 6:
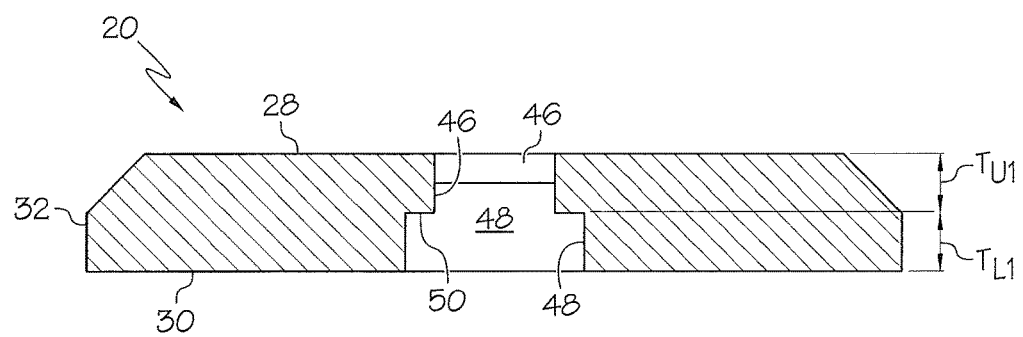
FIG. 6 is a section view of the base plate of FIG. 4, illustrating a channel defined in the base plate.
Figure 7:
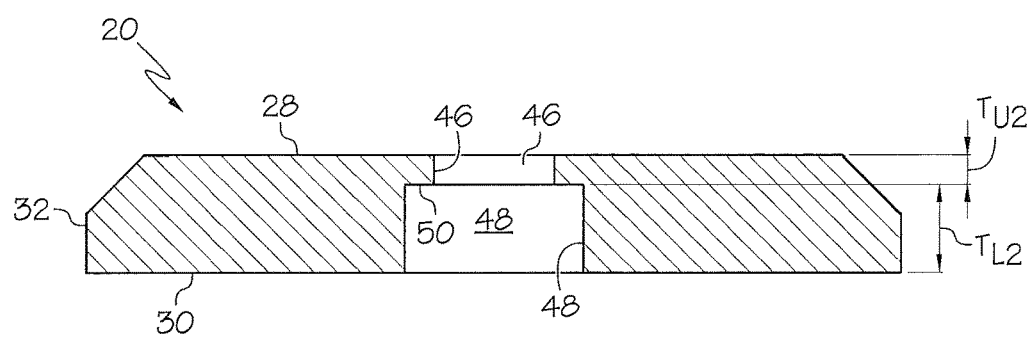
FIG. 7 is a section view of the base plate of FIG. 4, illustrating a pocket defined in the base plate.
Figure 8:
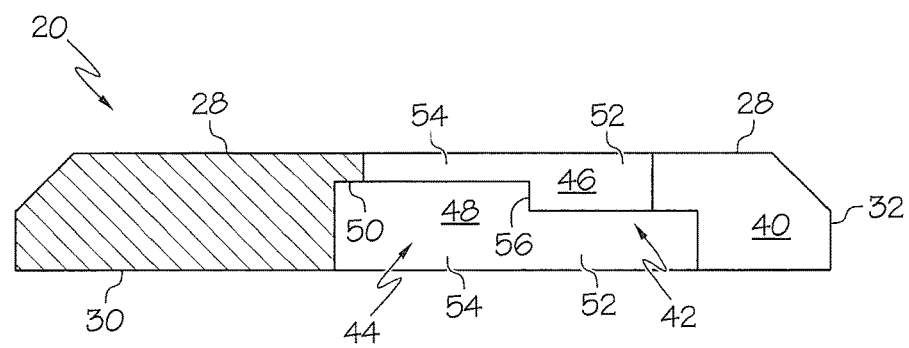
FIG. 8 is a section view of the base plate of FIG. 4, illustrating a channel and a pocket defined in the base plate.

The interior of slot 34, and channel 42 and pocket 44, can be defined by an upper sidewall 46 and a lower sidewall 48, as best shown in FIGS. 6-8. Upper sidewall 46 can extend downward from the upper edge of slot 34 defined in top wall 28 and lower sidewall 48 can extend upward from the bottom edge of slot 34 defined in bottom wall 30. As best shown in FIG. 1, both upper sidewall 46 and lower sidewall 48 can span around the entire interior perimeter of straight portion 38 on both sides of slot 34 until adjoining angled portion sidewalls 40. Upper sidewall 46 can protrude inward relative to lower sidewall 48, as best shown in FIG. 1, so that upper sidewall 46 slightly overhangs lower sidewall 48, forming a partial overhang 50. Partial overhang 50 can span the entire interior perimeter of sidewall straight portion 38 as shown in FIG. 4 As a result of this alignment, slot 34 includes a first width $W_1$ spanning between upper sidewall 46 on both sides of slot 34, and a second width $W_2$ spanning between lower sidewall 48 on both sides of slot 34.

Upper and lower sidewalls 46 and 48 can also be segmented into a channel region 52 and a pocket region 54, as best shown in FIG. 8. Both upper and lower sidewalls 46 and 48 can have essentially a stepped configuration between first and second regions 52 and 54. As shown in FIG. 8, upper sidewall 46 has a first depth or thickness $T_{U1}$ in the first region 52 and a second depth or thickness $T_{U2}$ in the second region 54, while lower sidewall 48 has a first depth or thickness $T_{L1}$ in the first region 52 and a second depth or thickness $T_{L2}$ in the second region 54. As a result of the stepped configuration, upper sidewall 46 can include a partial segmenting or partition wall 56, as best shown in FIG. 8.

The combination of upper and lower sidewalls 46 and 47, overhang 50, and partial segmenting wall 56 define channel 42 and pocket 44. Channel 42 can be defined by lower sidewall 48 on each side of slot 34 in the channel region 52 and overhang 50. Thus, channel 42 can have a width equal to second width $W_2$ between lower sidewall 48 on each side of slot 34, and channel 42 can have a depth or thickness equal to $T_{L1}$ of lower sidewall 48. Pocket 44 can be defined by lower sidewall 48 on each side of slot 34 in the pocket region 54, overhang 50 and partial segmenting wall 56. Thus, pocket 44 can have a width equal to second width $W_2$ between lower sidewall 48 on each side of slot 34, and pocket 44 can have a depth or thickness equal to $T_{L2}$ of lower sidewall 48. In one non-limiting example of the differing depths of the first and pockets 42 and 44, channel 42 can have a depth approximately equal to 0.5 inches while pocket can have a depth approximately equal to 0.75 inches, according to one particular embodiment of the present invention.

Figure 11:
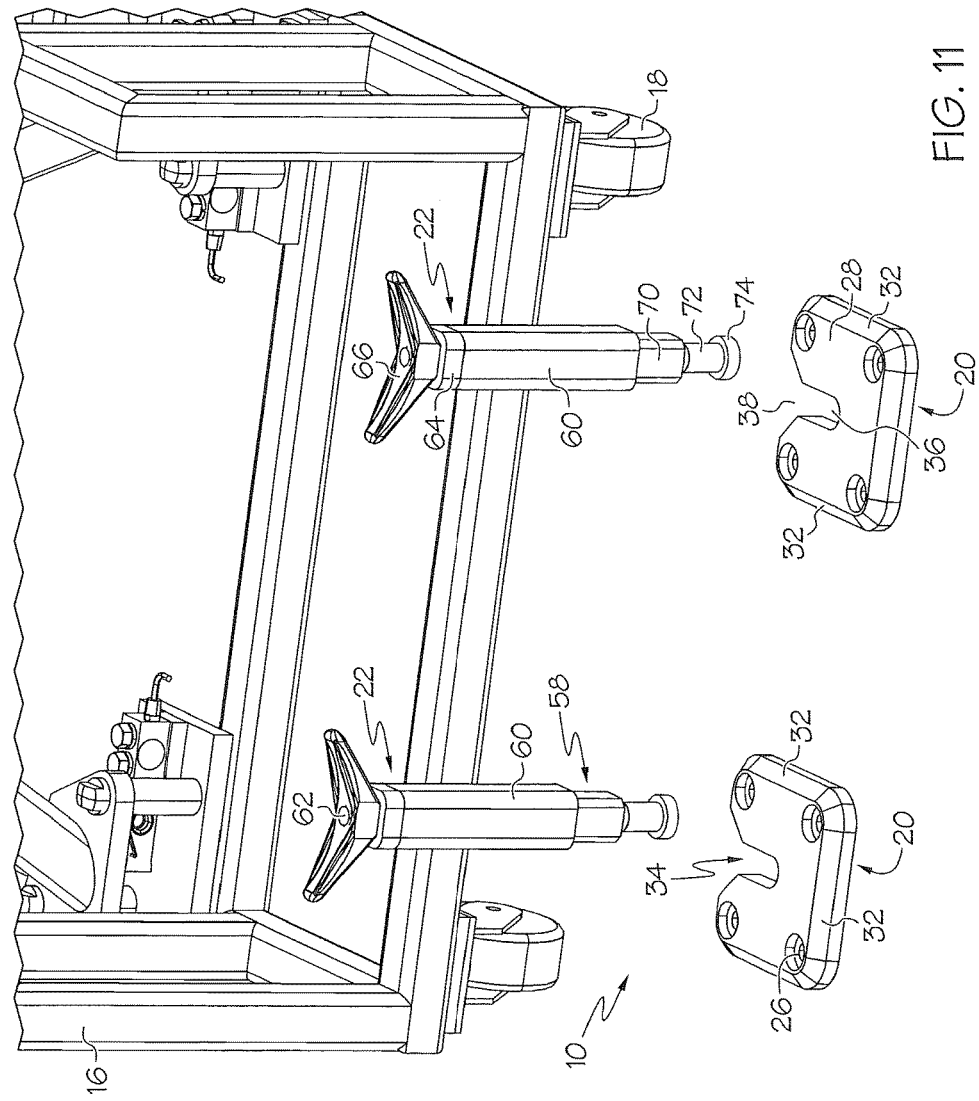
FIG. 11 is a top perspective view of an anchoring system in accordance with one embodiment of the present invention, illustrating the anchor rods being aligned with and directed into engagement with base plates having receiving slots.

The retractable anchor rod assembly 22 can comprise a number of components, including an anchor rod 58, an anchor extension 60, a threaded rod or member 62, a top plate 64, and a wingnut or handle 66, as best shown in FIGS. 9-11. Assembly 22 can be attached to frame 16 of device or vessel 14 through bolting, welding, or any other suitable fastening or attachment means. Assembly 22 can be attached to an existing device 14 so as to retrofit the existing device 14 or can be implemented in connection with a newly-constructed device 14.

In one embodiment, threaded rod member 62 is permanently connected to anchor rod 58, by machining it directly onto anchor rod 58 or welding it thereto, for example. In another embodiment, threaded rod member 62 is screwed into a top portion of anchor rod 58. Optional top plate 64 can be welded or otherwise attached to the top of anchor extension 60. Anchor extension 60 can be attached to frame 16 of device 14 by means of bolting or welding, for example. The subassembly of anchor rod 58 and threaded member 62 can be inserted into the bottom end of the subassembly of anchor extension 60 and top plate 64. Anchor rod 36 is preferably machined so that it may fit into and slide into anchor extension 60. As shown if FIG. 9, top plate 64 can be machined with an aperture 68 to accept threaded member 62. Once these two subassemblies are assembled, anchor rod 58 and threaded member 62 can be free to slide up and down inside anchor extension 60 and top plate 64 subassembly. Finally, wingnut or handle 66 is threaded on, or otherwise attached to, threaded member 62. Handle 66 can be used to adjust the length of anchor rod 58 subassembly by lifting and lowering anchor rod 58 via threaded member 62.

As best shown in FIG. 10B, anchor rod 58 can be formed or machined such that the profile has three distinct sections: a top section 70, an intermediate section 72, and a base section 74. Top section 70 can be configured and dimensioned for fitting within anchor section 60 while intermediate section 72 can be configured and dimensioned for connecting top section 70 and base section 74 together. Several different profiles and dimensions can be used for top section 70, intermediate section 74 and base section 74 depending on the particular embodiment of the present invention. According to the embodiment illustrated in the figures, top section 70 can be of a generally square profile with radiused corners. This profile can be of such dimension that it fits snuggly within anchor extension 60, while still allowing anchor rod 58 to slide up and down within anchor extension 60. According to the same embodiment, intermediate section 72 can be a shaft having a rounded profile and can have a filleted section with a fillet radius that transitions the shaft from the square profile of top section 70 to the rounded profile of the shaft. Base section 74, which may be in the form of a base or foot, can be a round profile. The foregoing represents just one embodiment of the anchor rod assembly 22 and anchor rod 58, as assembly 22 can have any number of different configurations so long that anchor rod 58 can be selectively movable in the vertical direction. Base section 74 also preferably has a diameter or width larger than the diameter or width of intermediate section 72 so that anchor rod 58 can be inserted and retained within slot 34 of base plate 20, as described in greater detail below.

The overall length of the anchor rod 58 can vary depending on the particular application of the present invention. A threaded hole 76 (see FIGS. 10A and 10B) can be drilled and tapped in the top end of anchor rod 58 to accept the threaded member 62. Anchor extension 60 can be a standard round or square tubing profile that is cut to the appropriate length for the desired application. Top plate 64 can be a plate that is machined to have an outer profile generally matching that of the anchor extension 60.

The interaction of base plate 20 and anchor rod assembly 22, and specifically the interaction of anchor rod 58 with channel 42 and pocket 44, enables system 10 to dock and secure portable device or vessel 14 to a surface 12. Intermediate section 72 of anchor rod 58 is preferably dimensioned with a diameter or width $W_{A1}$ less than the first width $W_1$ of upper sidewall 46 so that intermediate section 72 can be received by and engage slot 34. Base section 74 of anchor rod 58 is preferably dimensioned with a diameter or width $W_{A2}$ less than second width $W_2$ of lower sidewall 48 and a thickness $T_A$ less than the depth $T_{L1}$ of lower sidewall 48 in the first region 52 so that base section 74 can be received within and engage channel 42 when anchor rod 58 is received within slot 34 as illustrated in FIG. 13. Additionally, width $W_{A2}$ of base section 74 is preferably greater than $W_1$ of upper sidewall 46 so that base section 74 is at least partially restrained in the vertical direction while base section 74 is positioned in channel 42.

Figure 12:
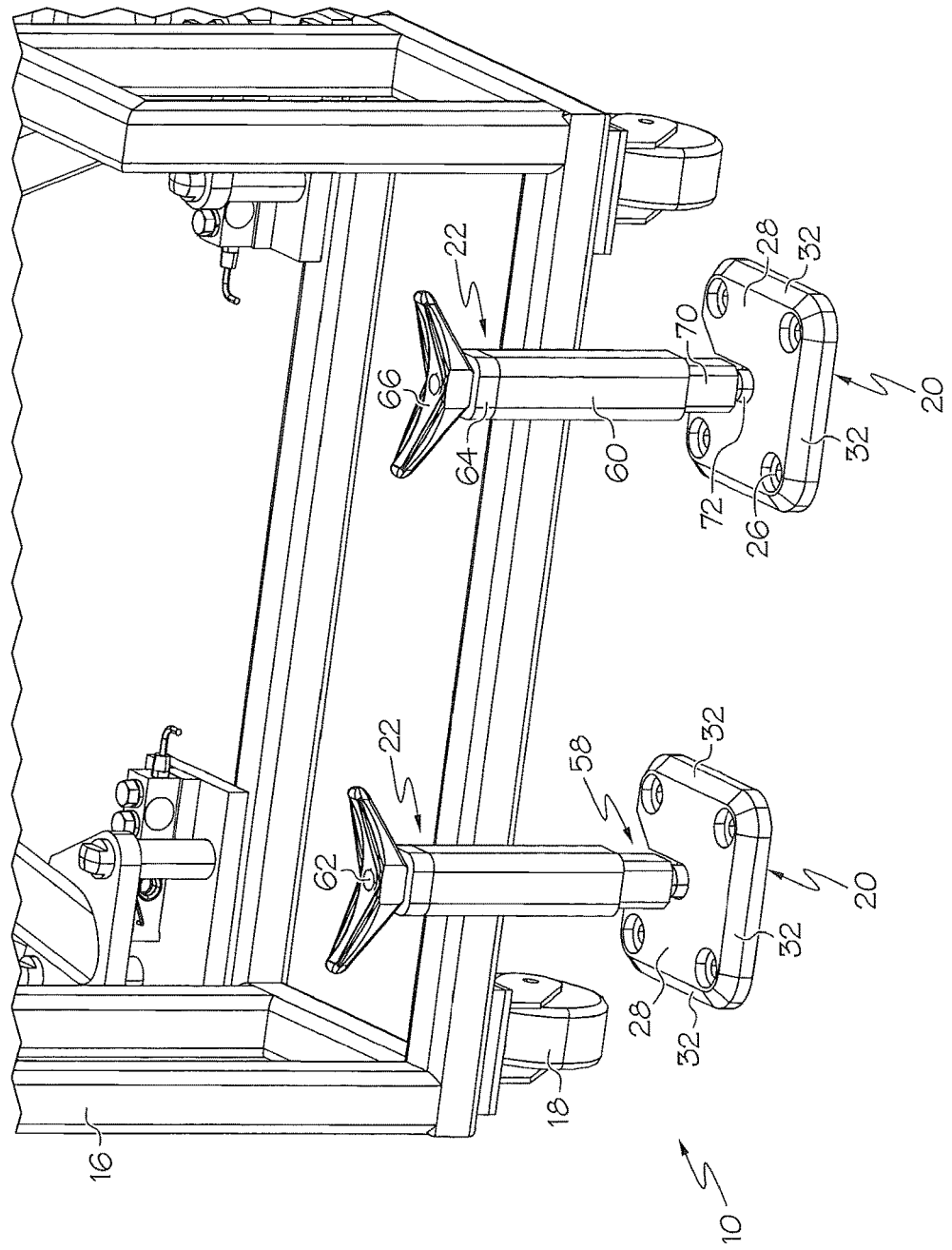
FIG. 12 is a top perspective view of the anchoring system of FIG. 11, illustrating anchor rods in partial engagement with slots of corresponding base plates.

Pocket 44 can have a perimeter, formed by lower sidewall 48 and partial segmenting wall 56, that is approximately similar to the cross-sectional shape of base section 74 of anchor rod 58 so that base section 74 can be fully received within pocket 44. According to one embodiment of the present invention, base section 74 has a circular cross-section, as shown in FIG. 12, which generally conforms to a rounded portion of lower sidewall 48, as shown in FIG. 1. Base section 74 can have several different cross-sectional configurations in alternative embodiments so long as base section 74 generally conforms to and can be received by pocket 44.

Figure 14:
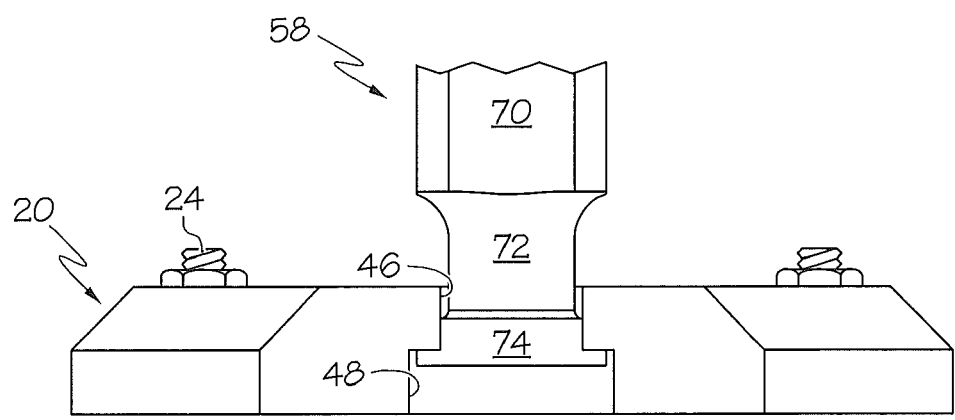
FIG. 14 is a side view of the anchoring system of FIG. 11, illustrating an anchor rod base or foot pulled snugly against the base plate.

With reference to FIGS. 11-14, operation of system 10 in conjunction with a portable device or vessel 14 will now be described in greater detail. As described above, base plate 20 can be secured to surface 12 where portable vessel 14 is intended to be docked and secured. Additionally, retractable anchor rod assembly 22 can be secured to frame 16 of portable vessel 14. When portable vessel 14 is ready to be secured, handle 66 of assembly 22 can be used to lower anchor rod 58 until base section 74 rests on surface 12 or just above surface 12 as illustrated in FIG. 11. Portable vessel 14 can then be rolled via frame wheels 18 (or slid or otherwise moved if no wheels are provided) until the intermediate section 72 of anchor rod 58 enters the angled portion 36 of slot 34. Angled portion 36 can then guide anchor rod 58 into straight portion 38 of slot 34 so that base section 74 of anchor rod 58 enters channel 42 as shown in FIG. 13. Portable vessel 14 can then be positioned further into slot 34 until anchor rod 58 has traveled beyond partial segmenting wall 56 and base section 74 has entered pocket 44, as best shown in FIG. 12. Handle 66 can then be used to raise anchor rod 58 into anchor extension 60 so that base section 74 is at least partially restrained by overhang 50 and partial segmenting wall 56, as best shown in FIG. 14. As shown in FIG. 14, partial segmenting wall 56, on each side of slot 34 restricts base section 74 from moving in one horizontal direction while lower sidewall 48 restricts base section 74 from moving in the other horizontal directions. Additionally, overhang 50 and upper sidewall 46 restricts base section 74 from moving in the vertical direction. As a result, portable vessel 14 is temporarily secured in position.

When portable vessel 14 is then ready to be moved, handle 66 is used to lower anchor rod 58 until base section 74 is positioned fully below partial segmenting wall 56. Portable vessel 14 can then be moved away from base plate 20 so that base section 74 of anchor rod 58 travels through channel 42 and out of slot 34. Portable vessel 14 can then be freely moved away from base plate 20.

Depending on the particular embodiment of the present invention, more than one base plate 20-removable rod assembly 22 combination can be used in system 10. For example, FIG. 3 illustrates an embodiment where four base plate 20-removable rod assembly 22 combinations are used. as shown in FIG. 3, when multiple combinations are used, removable rod assemblies 22 should be positioned on frame 16 so that they align with base plates 20 positioned on surface 12.

Docking and undocking portable vessel 14 during operation of system 10, according to one particular embodiment of the present invention, can be as follows:

Docking the Vessel
1. With the anchor rods 58 elevated by the wingnut handles 66, the vessel 14 is located near the base plates 20.
2. The wingnut handles 66 are loosened so that the bottoms of the anchor rods 58 rest on or near the floor 12, as best shown in FIG. 11.
3. The vessel 14 is then positioned so that the anchor rods 58 line up with the angled portions 36 of the slots 34 of the base plates 20.
4. Next, the vessel 14 is rolled so that the anchor rods 58 are slidingly received within the slots 34 of the base plates 20, as best shown in FIGS. 12 and 13.
5. Once the vessel 14 is located so that the anchor rods 58 are generally in the center of the base plates 20, the wingnut handles 66 are tightened so they are snugly pulling the base sections 74 of the anchor rods 58 into the pockets 44 defined in the base plates 20, as shown in FIG. 14. This constrains the vessel 14 from moving laterally and vertically during earthquakes, tremors, aftershocks and other seismic events. The caster wheels 18 provide support from downward loads.

Undocking the Vesssel
1. The wingnut handles 66 are loosened allowing the anchor rods 58 to lower to rest on or near the floor 12.
2. The vessel 14 is rolled so that the anchor rods 58 exit the slots 34 of the base plates 20 and are disengaged therefrom.
3. Once the anchor rods 58 are clear of the base plates 20, the wingnut handles 66 may be tightened to elevate the bottoms of the anchor rods 58 so they do not get caught on any item that may reside near the floor 12.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An anchoring system for securing a portable device to a surface, said system comprising:
   a portable device to be temporarily secured to a surface to prevent relative movement between said portable device and said surface, wherein said portable device is mounted on two or more wheels, two or more casters, or at least one wheel and at least one caster;
   a base plate secured to said surface, said base plate comprising:
   a top wall;
   a bottom wall;
   a slot defined generally longitudinally into said base plate and downward from said top wall, said slot having a length defined by a first open end and a second closed end;
   a channel defined within said slot; and
   a pocket defined within said slot and disposed proximate said second closed end; and
   a retractable anchor rod assembly operably connected to said portable device, said retractable anchor rod assembly comprising:
   an extension component; and
   an anchor rod selectively movable in the vertical direction within said extension component, said anchor rod including an intermediate section and a base section connected to an end of said intermediate section;
   said retractable anchor rod assembly including a handle operably connected to said intermediate section so that a movement of said handle results in a selective movement of said intermediate section and said base section between a sliding position and a secured position;
   wherein said anchor rod is configured for selectively engaging said slot; and
   wherein said channel and said pocket are configured for receiving said base section of said anchor rod, and wherein when said intermediate section and said base section are in said secured position, said base section is received into said pocket to temporarily secure said portable device to said surface.

2. The anchoring system of claim 1, wherein said portable device is secured to a frame and said retractable anchor rod assembly is secured to said frame such that said handle is accessible when said intermediate section and said base section are in said secured position.

3. The anchoring system of claim 1, wherein said retractable anchor rod assembly is configured for lowering said base section of said anchor rod to said surface.

4. The anchoring system of claim 1, wherein said channel has a cross-sectional shape that generally conforms to a cross-sectional shape of said base section.

5. The anchoring system of claim 1, wherein said slot includes an upper sidewall and a lower sidewall each defined in said base plate, and wherein said upper sidewall and said lower sidewall at least partially define a perimeter of said slot.

6. The anchoring system of claim 5, wherein said upper sidewall of said slot extends laterally into said slot further than said lower sidewall creating an overhang wall defined generally horizontally between said upper sidewall and said lower sidewall.

7. The anchoring system of claim 6, wherein said channel and said pocket are partially divided by a partial segmenting wall defined generally vertically in said upper sidewall.

8. The anchoring system of claim 7, wherein said slot has a lower sidewall width defined between said lower sidewall on each side of said slot, wherein said slot has an upper sidewall width defined between said upper sidewall on each side of said slot, and wherein said lower sidewall width is greater than said upper sidewall width.

9. The anchoring system of claim 8, wherein said base section of said anchor rod has a base section width that is greater than said upper sidewall width and less than said lower sidewall width.

10. The anchoring system of claim 9, wherein said intermediate section of said anchor rod has an intermediate section width that is less than said upper sidewall width.

11. The anchoring system of claim 10, wherein said lower sidewall has a first depth in said channel and a second depth in said pocket, and wherein said second depth is greater than said first depth.

12. The anchoring system of claim 11, wherein said base section of said anchor rod has a base section depth that is less than said first depth of said lower sidewall.

13. The anchoring system of claim 12, wherein said base section of said anchor rod is vertically movable in said pocket a distance equal to said second depth of said lower sidewall less said base section depth.

14. The anchoring system of claim 13, wherein when said base section has traveled in said pocket said distance, said overhanging wall restrains upward movement by said base section.

15. The anchoring system of claim 1, wherein said base section includes a defined area having a defined perimeter, and a thickness, and said pocket comprises a recess defined by a second perimeter wherein said second perimeter is complimentary to said defined perimeter of said base section so that at least a portion of the thickness of said base section can be received within said pocket.

16. An anchoring system for securing a portable device to a floor, said anchoring system comprising:
   a portable device to be temporarily secured to a floor to prevent relative movement between said portable device and said floor, wherein said portable device is mounted on two or more wheels, two or more casters, or at least one wheel and at least one caster;
   a base plate secured to said floor, said base plate having a slot opening cut into said base plate, said slot opening comprising:
   a first open end and a second closed end;
   an upper sidewall extending downward from a top edge of said slot;
   a lower sidewall set back from said upper sidewall and extending downward from said upper sidewall;
   an overhang wall extending horizontally between said upper sidewall and said lower sidewall; and
   a partition wall defined vertically into said upper sidewall and segmenting said upper and lower sidewalls into a channel and a pocket, said pocket having a depth greater than a depth of said channel and said pocket disposed proximate said second closed end; and
   a retractable anchor rod assembly secured to a portable device frame defined around said portable device, said retractable anchor rod assembly comprising:

an extension component;

an anchor rod configured for being selectively vertically movable relative to said extension component between a secured position and an sliding position, said anchor rod having a base section at its lower end; and a handle operably connected to said anchor rod and wherein said handle is disposed for movement wherein movement of said handle effectuates a selective movement of said anchor rod in a vertical direction relative to said extension component between said secured position and said sliding position;

wherein said retractable anchor rod assembly is disposed on said portable device frame so a user can grip said handle when said anchor rod is in both said secured position and said sliding position, wherein said base section has a width greater than a width of said slot opening at said upper sidewall and said base section width is less than a width of said slot opening at said lower sidewall, and wherein said base section has a depth less than said depth of said channel;

wherein said base section and said slot opening are configured for allowing said base section to move laterally in said channel between said first open end and said second closed end, and when said anchor rod is in said sliding position; and wherein when said anchor rod is moved into said secured position, said base section is vertically moved upward and received in said pocket, and said partition wall is disposed to prevent said base section from moving laterally.

17. The anchoring system of claim 16, wherein when said base section is moved vertically upward and received in said pocket in said secured position, said portable device is restrained from moving in a vertical direction and a plurality of horizontal directions.

18. The anchoring system of claim 16, wherein said base plate is a first base plate and said retractable anchor rod assembly is a first retractable anchor rod assembly;

wherein said anchoring system further comprises a second base plate secured to said floor, said second base plate of identical construction to said first base plate, and a second retractable anchor rod assembly secured to said portable device frame, said second retractable anchor rod assembly of identical construction to said first retractable anchor rod assembly, and wherein said first retractable anchor rod assembly engages the first base plate and the second retractable anchor rod assembly engages the second base plate, and when said anchor rod of both said first and second retractable anchor rod assemblies are in said secured position, said portable device is secured to said floor to resist seismic loading forces.

19. The anchoring system of claim 16, wherein a rotation of said handle about a vertical axis moves said anchor rod in a vertical direction relative to said extension component via a threaded member operably connected to said handle.

* * * * *